US011150531B1

(12) United States Patent
Zhang et al.

(10) Patent No.: US 11,150,531 B1
(45) Date of Patent: Oct. 19, 2021

(54) ARRAY SUBSTRATE, LIQUID CRYSTAL DISPLAY PANEL, AND LIQUID CRYSTAL DISPLAY DEVICE

(71) Applicant: Shenzhen China Star Optoelectronics Semiconductor Display Technology Co., Ltd., Shenzhen (CN)

(72) Inventors: Xin Zhang, Shenzhen (CN); Lixuan Chen, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 180 days.

(21) Appl. No.: 16/627,815

(22) PCT Filed: Nov. 27, 2019

(86) PCT No.: PCT/CN2019/121370
§ 371 (c)(1),
(2) Date: Dec. 31, 2019

(87) PCT Pub. No.: WO2021/031443
PCT Pub. Date: Feb. 25, 2021

(30) Foreign Application Priority Data

Aug. 21, 2019 (CN) .......................... 201910772710.9

(51) Int. Cl.
*G02F 1/1362* (2006.01)
*G02F 1/1333* (2006.01)
(Continued)

(52) U.S. Cl.
CPC ...... *G02F 1/136295* (2021.01); *G02F 1/1368* (2013.01); *G02F 1/13439* (2013.01);
(Continued)

(58) Field of Classification Search
CPC ............ G02F 1/1368; G02F 1/136286; G02F 1/133512; G02F 1/136227; G02F 1/13439;
(Continued)

(56) References Cited

U.S. PATENT DOCUMENTS

2007/0291195 A1* 12/2007 Kim .................. G02F 1/136286
349/44
2009/0032818 A1  2/2009 Kim
2012/0313907 A1  12/2012 Yamazaki et al.

FOREIGN PATENT DOCUMENTS

CN          1508612      6/2004
CN          100565311    12/2009
(Continued)

OTHER PUBLICATIONS

Unknown "Principle and Design of Thin Film Transistor Liquid Crystal Display", Publishing House of Electronics Industry, Chap. 10: 330-334, 2016. English Abstract.

*Primary Examiner* — Thoi V Duong

(57) ABSTRACT

The present invention provides an array substrate, a liquid crystal display panel, and a liquid crystal display device. The array substrate includes a substrate and first metal wires, pixel electrodes, second metal wires, and thin film transistors disposed on the substrate. The first metal wires include transverse and longitudinal wires. Intersecting portions of the transverse and longitudinal wires form corner regions. The second metal wires can shield the longitudinal wires edges and the corner regions to prevent "bright spot in a dark image state" due to light leakage of edges of the longitudinal wires and the corner regions. The liquid crystal display panel and display device include color filter substrate, the color filter substrate comprises a black matrix, and the black matrix shield light leakage of the first metal wires and the (Continued)

second metal wires edges to further achieve removal of the "bright spot in the dark image state".

20 Claims, 5 Drawing Sheets

(51) Int. Cl.
*G02F 1/1368* (2006.01)
*G02F 1/1343* (2006.01)
*G02F 1/1335* (2006.01)

(52) U.S. Cl.
CPC .. *G02F 1/133512* (2013.01); *G02F 1/133514* (2013.01); *G02F 1/136218* (2021.01); *G02F 1/136227* (2013.01); *G02F 1/136286* (2013.01)

(58) Field of Classification Search
CPC ......... G02F 1/133345; G02F 1/133514; G02F 1/134309; G02F 1/136295; G02F 1/13629; G02F 1/1362; G02F 1/136218; G02F 1/1343
See application file for complete search history.

(56) References Cited

FOREIGN PATENT DOCUMENTS

| CN | 103117283 | 5/2013 |
|----|-----------|--------|
| CN | 107976849 | 5/2018 |
| CN | 109976058 | 7/2019 |
| JP | 2000-258801 | 9/2000 |
| KR | 10-2014-0078266 | 6/2014 |

* cited by examiner

ARRAY SUBSTRATE, LIQUID CRYSTAL DISPLAY PANEL, AND LIQUID CRYSTAL DISPLAY DEVICE

RELATED APPLICATIONS

This application is a National Phase of PCT Patent Application No. PCT/CN2019/121370 having International filing date of Nov. 27, 2019 which claims the benefit of priority of Chinese Patent Application No. 201910772710.9 filed on Aug. 21, 2019. The contents of the above applications are all incorporated by reference as if fully set forth herein in their entirety.

FIELD AND BACKGROUND OF THE INVENTION

The present invention relates to a field of display technologies, especially relates to an array substrate, a liquid crystal display panel, and a liquid crystal display device.

A liquid crystal display panel is a primary element of a liquid crystal display device, and the liquid crystal display panel comprises an array substrate, a color filter substrate, a liquid crystal layer, and a polarizer. Inner sides of the color filter substrate and the array substrate are disposed with transparent electrodes. The transparent electrodes emit an electrical field toward the liquid crystal layer. The liquid crystal display panel controls orientation of liquid crystal in the liquid crystal layer by the electrical field of the transparent electrodes to further control a polarization status of light extending through the liquid crystal layer to perform penetration of light and block to light by a polarizer to achieve an objective of display.

Criss-cross metal wires such as data lines and gate electrode lines and metal electrodes are disposed in an array substrate. Such metal wires are not transparent and therefore light can only pass through gaps among the metal wires. When light extends through edges of the metal wires, the edges and corners of the metal wires affect a polarizing direction of light. If a polarizing direction of light is changed, such light with the changed polarizing direction causes light leakage when passing through the polarizer. Therefore, a bright spot occur when the liquid crystal display panel presents a dark image, i.e., "bright spot in a dark image state". The corners of the metal wires has greatest influence to the polarizing direction of light so an issue of occurrence of "bright spots in a dark image state" is worst in the corner regions of the metal wires.

SUMMARY OF THE INVENTION

Technical Issue

Edges and corners of metal wires of an array substrate change a polarizing direction of light passing nearby, and result in bright spots when liquid crystal display panel present dark images, i.e., a "bright spot in a dark image state", which influences visual effect and product quality of the liquid crystal display panel.

Technical Solution

To solve the above technical issue, the present invention provides solutions as follows:

The present invention provides an array substrate, comprising:

a substrate;

first metal wires disposed on the substrate, wherein the first metal wires comprise transverse wires and longitudinal wires;

pixel electrodes disposed on a side of the substrate disposed with the first metal wires, wherein the pixel electrodes are located in regions enclosed by the transverse wires and the longitudinal wires;

second metal wires disposed on the side of the substrate disposed with the first metal wires, wherein the second metal wires are insulated from the first metal wires, and a projection region of the second metal wires on the substrate covers a projection region of the longitudinal wires on the substrate; and thin film transistors disposed on the side of the substrate disposed with the first metal wires, wherein a gate electrode of each of the thin film transistors is connected to one of the first metal wires, a drain electrode of the thin film transistors is connected to one of the pixel electrodes, the and a source electrode of the thin film transistors is connected to one of the second metal wires.

In the array substrate of the present invention, the second metal wires and the longitudinal wires are disposed parallelly.

In the array substrate of the present invention, a width of each of the second metal wires is greater than a width of each of the longitudinal wires.

In the array substrate of the present invention, an insulation layer is disposed between the first metal wires and the second metal wires.

In the array substrate of the present invention, the pixel electrodes are insulated from the first metal wires.

In the array substrate of the present invention, an insulation layer is disposed in intersecting portions between the pixel electrodes and the first metal wires and in intersecting portions between the pixel electrodes and the second metal wires.

In the array substrate of the present invention, material of the first metal wires and the second metal wires is copper.

In the array substrate of the present invention, the pixel electrodes are transparent metal oxide electrodes.

In the array substrate of the present invention, the pixel electrodes are indium tin oxide electrodes.

The present invention also provides a liquid crystal display panel, comprising:

the array substrate as claimed in claim 1; and a color filter substrate disposed on a side of the array substrate disposed with the first metal wires, and disposed opposite to the array substrate;

a liquid crystal layer disposed between the array substrate and the color filter substrate;

wherein the color filter substrate comprises a color resist array including a plurality of color resist blocks and a black matrix disposed among the color resist blocks, a projection region of the black matrix on the substrate covers a projection region of the second metal wires on the substrate.

In the liquid crystal display panel of the present invention, in the array substrate, the second metal wires and the longitudinal wires are disposed parallelly.

In the liquid crystal display panel of the present invention, a width of the second metal wires is greater than a width of the longitudinal wires.

In the liquid crystal display panel of the present invention, an insulation layer is disposed between the first metal wires and the second metal wires.

In the liquid crystal display panel of the present invention, an insulation layer is disposed in intersecting portions between the pixel electrodes and the first metal wires and in intersecting portions between the pixel electrodes and the second metal wires.

In the liquid crystal display panel of the present invention, a projection region of the black matrix on the substrate covers a projection region of the transverse wires on the substrate.

In the liquid crystal display panel of the present invention, a projection region of the black matrix on the substrate covers a projection region of the thin film transistors on the substrate.

In the liquid crystal display panel of the present invention, the color resist blocks at least comprise red, green, and blue color resist blocks.

the present invention provides another liquid crystal display device, comprising:

the liquid crystal display panel as claimed in claim 6; and a backlight module disposed on a side of the array substrate away from the first metal wires, and providing the liquid crystal display panel with backlight.

In the liquid crystal display device of the present invention, the second metal wires and the longitudinal wires are disposed parallelly, a width of the second metal wires is greater than a width of the longitudinal wires, and a projection region of the black matrix on the substrate covers a projection region of the transverse wires and the thin film transistors on the substrate.

In the liquid crystal display device of the present invention, the array substrate is disposed on an upper layer of the backlight module, the liquid crystal layer is disposed on an upper layer of the array substrate, and the color filter substrate is disposed on an upper layer of the liquid crystal layer.

Advantages

The present invention, by using the second metal wires to shield edge and corner regions of the first metal wires, and by using the black matrix to shield the edges of the first metal wires and the second metal wires, is able to remove the "bright spot in the dark image state" due to light leakage of edge and corner regions of the first metal wires and second metal wires to improve quality of displayed images of the display panel.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

Figure 1:
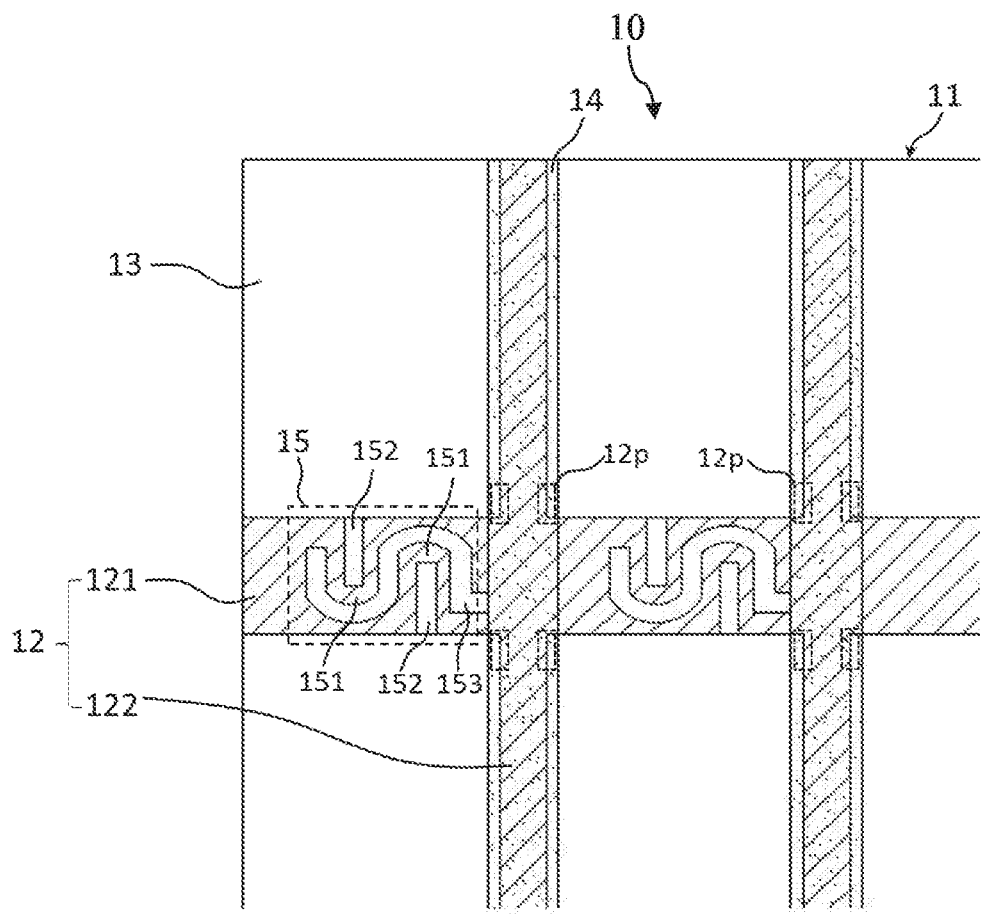
FIG. 1 is a schematic partial structural view of an array substrate provided by an embodiment of the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

An embodiment of the present invention provides an array substrate applied to a liquid crystal display panel. The array substrate comprises first metal wires and second metal wires. The second metal wires can shield periphery and corner regions of the first metal wires to prevent light leakage from occurring in periphery and corner regions of the first metal wires to obviate a "bright spot in a dark image state" due to light leakage of the periphery and corner regions of the first metal wires.

With reference to FIG. 1, FIG. 1 is a schematic partial structural view of an array substrate provided by an embodiment of the present invention. The array substrate 10 comprises a substrate 11, first metal wires 12, pixel electrodes 13, second metal wires 14 and thin film transistors 15. The first metal wires 12, the pixel electrodes 13, the second metal wires 14, and the thin film transistors 15 are disposed on a same side of the substrate 11.

The first metal wires 12 comprises transverse wires 121 and longitudinal wires 122. Corner regions 12$p$ are formed in intersecting portions between the transverse wires 121 and the longitudinal wires 122. Optionally, material of the first metal wires 12 can be copper or other metal with excellent conductivity to ensure the conducting ability of the first metal wires 12.

The pixel electrodes 13 are disposed in regions enclosed by the transverse wires 121 and the longitudinal wires 122. Optionally, the pixel electrodes 13 are insulated from the first metal wires 12. When the array substrate 10 is applied in the liquid crystal display panel, the pixel electrodes 13 provides the liquid crystal display panel with an electrical field to control liquid crystal in the liquid crystal display panel to rotate. Optionally, the pixel electrodes can be transparent metal oxide electrodes such as indium tin oxide (ITO) electrodes.

Figure 4:
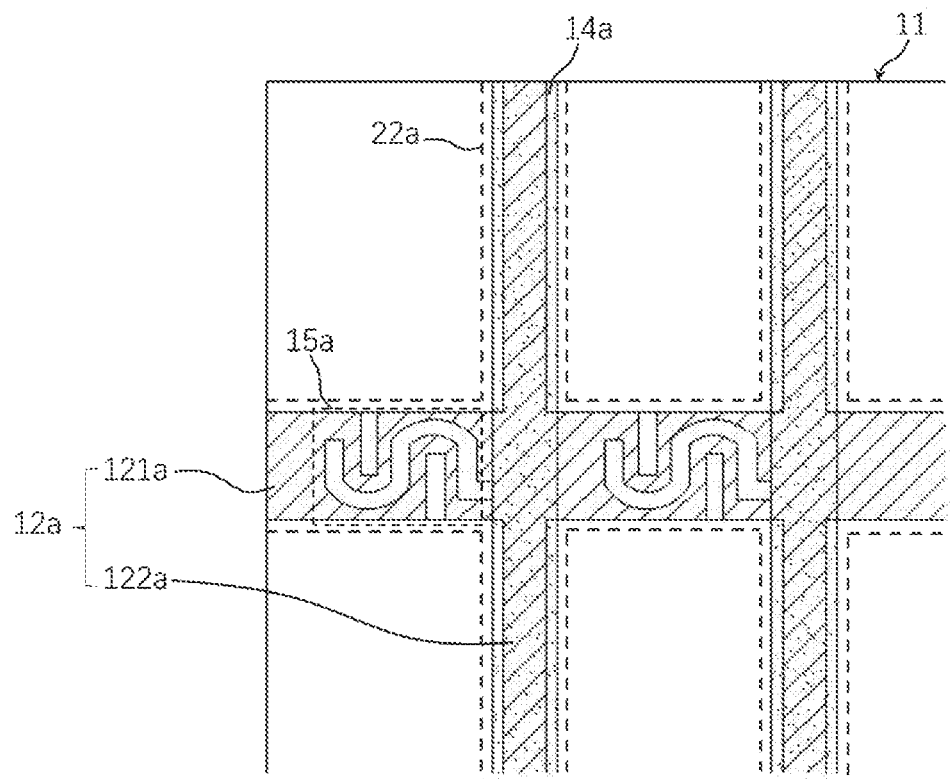
FIG. 4 is a schematic view of a projection of first metal wires, second metal wires, and thin film transistors in FIG. 1 on a substrate, and a projection of a black matrix in FIG. 3 on the substrate.

The second metal wires 14 are insulated from the first metal wires 12 and are insulated from the pixel electrodes 13. Optionally, an insulation layer is disposed between the first metal wires 12 and the second metal wires 14. An insulation layer is disposed in intersecting portions between the pixel electrodes 13 and the first metal wires 12 and in intersecting portions between the pixel electrodes 13 and the second metal wires 14. With reference to FIGS. 1 and 4, a projection region 14$a$ of the second metal wires 14 on the substrate 11 covers a projection region 122$a$ of the longitudinal wires 122 on the substrate 11. Optionally, the second metal wires 14 and the longitudinal wires 122 are disposed parallelly, and a width of each of the second metal wires 14 is greater than a width of each of the longitudinal wires 122. The second metal wires 14 can shield the periphery and corner regions 12p of the longitudinal wires 122. When the array substrate 10 is applied to the liquid crystal display panel, light leakage in the periphery and corner regions 12p of the longitudinal wires 122 can be shielded by the second metal wires 14 to remove the "bright spot in the dark image state". Optionally, material of the second metal wires 14 can be copper or other metal with excellent conductivity to ensure conductive ability of the second metal wires 14.

According to an embodiment of the present invention, a gate electrode 151 of each of the thin film transistors 15 is connected to one of the first metal wires 12, a drain electrode 152 of each of the thin film transistors 15 is connected to one of the pixel electrodes 13, and a source electrode 153 of each of the thin film transistors 15 is connected to one of the second metal wires 14. Therefore, the first metal wires 12 can control the second metal wires 14 to be connected to or disconnected from the pixel electrodes 13 through the thin film transistors 15. When the array substrate 10 is applied to the liquid crystal display panel, an external control circuit transmits control signals toward the first metal wires 12, an external data circuit transmits data signals toward the second metal wires, the thin film transistors 15 under effect of the control signals controls and transports the data signals toward the pixel electrodes 13 to further control rotation of liquid crystal in the liquid crystal display panel such that the liquid crystal display panel displays images.

Optionally, the substrate 11 can be a transparent glass substrate top guarantee a transmittance and an aperture rate of the array substrate 10.

The array substrate provided by the embodiment of the present invention, sets a width of each of the second metal wires to be greater than a width of each of the longitudinal wires such that the second metal wires shields the periphery and corner regions of the first metal wires to solve the issue of light leakage of the periphery and corner regions of the first metal wires.

Figure 2:
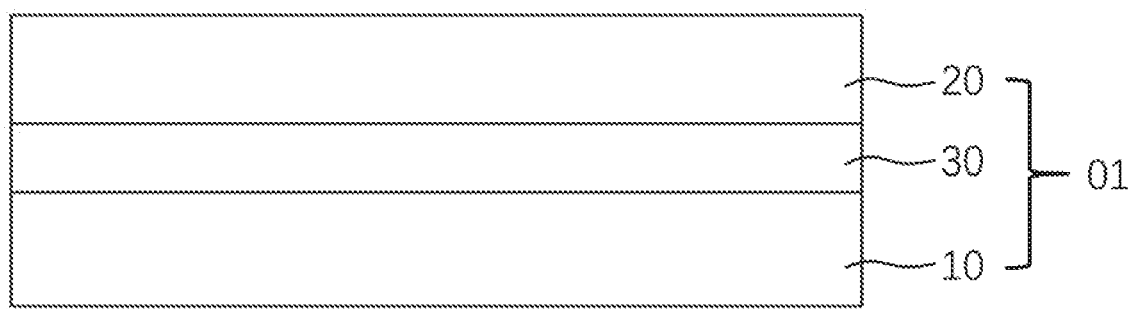
FIG. 2 is a schematic structural view of a liquid crystal display panel provided by an embodiment of the present invention.

Another embodiment of the present invention provides a liquid crystal display panel, with reference to FIG. 2, the liquid crystal display panel 01 comprises the array substrate 10 of the above embodiment and a color filter substrate 20 disposed opposite to the array substrate 10. The color filter substrate 20 is disposed on a side of the array substrate 10 disposed with the first metal wires. A liquid crystal layer 30 is disposed between the array substrate 10 and the color filter substrate 20, and the liquid crystal layer 30 comprises liquid crystal.

Figure 3:
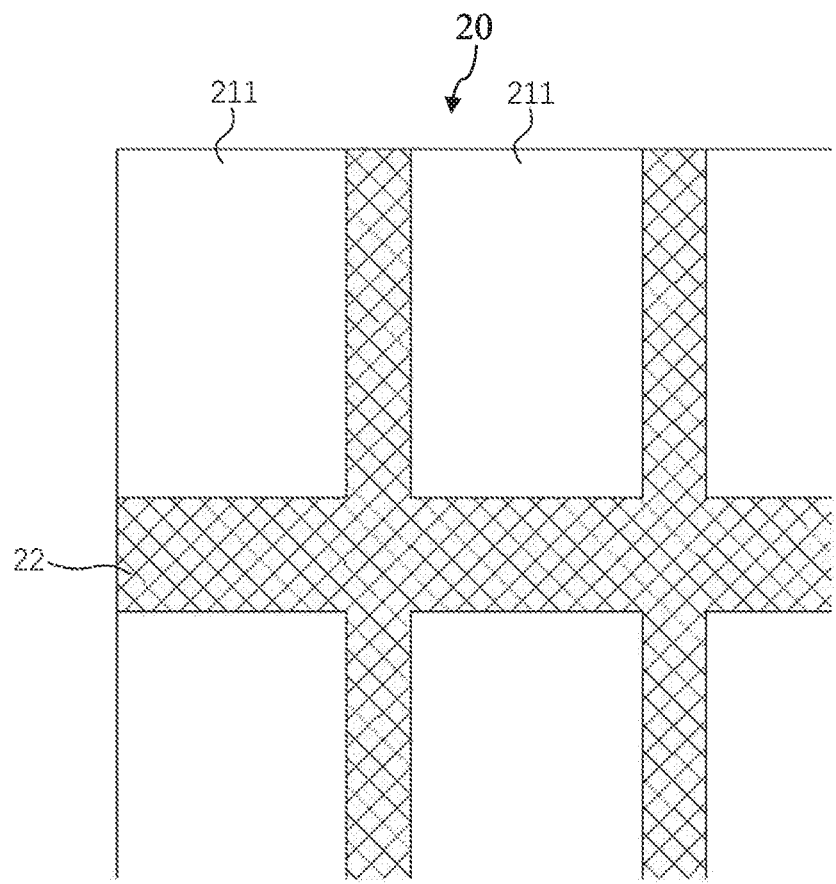
FIG. 3 is a schematic partial structural view of a color filter substrate provided by an embodiment of the present invention.

With reference to FIG. 3, FIG. 3 is a schematic partial structural view of a color filter substrate 20 provided by an embodiment of the present invention. The color filter substrate 20 comprises a color resist array including a plurality of color resist blocks 211 and a black matrix 22 disposed among the color resist blocks 211. The black matrix 22 is configured to shield boundary regions each of which is between adjacent two of the color resist blocks 211 to prevent lights emitted from the boundary regions among the color resist blocks 211 from interfering with one another to cause abnormal display of the liquid crystal display panel.

FIG. 4 is a schematic view of a projection of first metal wires 12, second metal wires 14, and thin film transistors 15 in FIG. 1 on a substrate 11, and a projection of a black matrix 22 in FIG. 3 on the substrate 11. A projection region of the first metal wires 12 on the substrate 11 is marked with a reference character 12a, a projection region of the second metal wires 14 on the substrate 11 is marked with a reference character 14a, a projection region of the thin film transistors 15 on the substrate 11 is marked with a reference character 15a, and a projection region of the black matrix 22 on the substrate 11 is marked with a reference character 22a.

With reference to FIGS. 1 to 4, a projection region 22a of the black matrix 22 on the substrate 11 covers a projection region 14a of the second metal wires 14 on the substrate 11. When the liquid crystal display panel emits light and display, light passes sequentially through the array substrate 10, the liquid crystal layer 30, and the color filter substrate 20 and then presents different images. The black matrix 22 shields light extending through edges of the second metal wires 14 and obviates the "bright spot in the dark image state" due to light leakage of the edges of the second metal wires 14.

With reference to FIGS. 1 to 4, the projection region 22a of the black matrix 22 on the substrate 11 covers a projection region 121a of the transverse wires 121 on the substrate 11. The transverse wires 121 would affect a polarizing direction of light passing through edges thereof to cause light leakage on the edges of the transverse wires 121. Because shielding effect of the black matrix 22 to the transverse wires 121, the light leakage can be shielded to obviate the "bright spot in the dark image state" on the edges of the transverse wires 121.

With reference to FIGS. 1 to 4, the projection region 22a of the black matrix 22 on the substrate 11 covers a projection region 15a of the thin film transistors 15 on the substrate 11 such that the black matrix 22 shields the thin film transistors 15 to prevent abnormal display of the display panel caused by light reflection of surfaces of the thin film transistors 15.

According to an embodiment of the present invention, as shown in FIG. 3, the color resist blocks 211 comprises at least red, green, and blue color resist blocks. The color resist blocks 211 are configured to filter incident light to emit light with colors the same to those of the color resist blocks 211. For example, the red color resist blocks only allow red light to pass therethrough such that the light passing through the red color resist blocks is red light.

The liquid crystal display panel provided by the embodiment of the present invention uses the second metal wires to shield the edges of the longitudinal wires and the corners of the longitudinal wires and the transverse wires to obviate the "bright spot in the dark image state" on the edges of the longitudinal wires and the corners of the longitudinal wires and the transverse wires corners. In the meantime, the black matrix is used to shield the edges of the second metal wires and the transverse wires to obviate the bright spot in the dark image state on the edges of the second metal wires and the transverse wires. Therefore, the liquid crystal display panel provided by the embodiment of the present invention can effectively obviate the "bright spot in the dark image state" due to light leakage on the edges and the corners of the metal wires.

Figure 5:
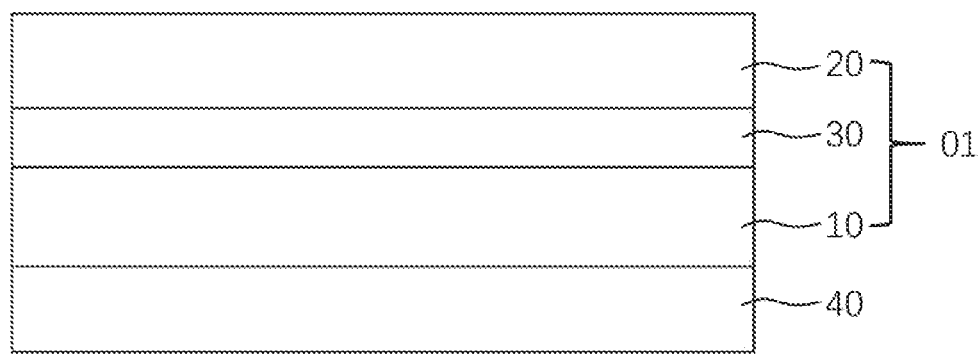
FIG. 5 is a schematic structural view of a liquid crystal display device provided by an embodiment of the present invention.

Another embodiment of the present invention provides a liquid crystal display device, as shown in FIG. 5, the liquid crystal display device comprises a liquid crystal display panel 01 provided by the above embodiment. In other words, the liquid crystal display device comprises an array substrate 10, a color filter substrate 20, and a liquid crystal layer 30. The liquid crystal display device further comprises a backlight module 40, and the backlight module 40 is disposed on a side of the array substrate 10 away from the first metal wires 12 (with reference to FIG. 1). The backlight module 40 provides the liquid crystal display panel 01 with backlight. The liquid crystal display panel 01 uses backlight provided by the backlight module 40 to display images.

The liquid crystal display device provided by the embodiment of the present invention, because of including the liquid crystal display panel of the embodiment of the present invention, has advantages of the liquid crystal display panel provided by the embodiment of the present invention.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. An array substrate, comprising:
    a substrate;
    first metal wires disposed on the substrate, wherein the first metal wires comprise transverse wires and longitudinal wires;
    pixel electrodes disposed on a side of the substrate disposed with the first metal wires, wherein the pixel electrodes are located in regions enclosed by the transverse wires and the longitudinal wires;
    second metal wires disposed on the side of the substrate disposed with the first metal wires, wherein the second metal wires are insulated from the first metal wires, and a projection region of the second metal wires on the substrate covers a projection region of the longitudinal wires on the substrate; and
    thin film transistors disposed on the side of the substrate disposed with the first metal wires, wherein a gate electrode of each of the thin film transistors is connected to one of the first metal wires, a drain electrode of the thin film transistors is connected to one of the pixel electrodes, and a source electrode of the thin film transistors is connected to one of the second metal wires.

2. The array substrate as claimed in claim 1, wherein the second metal wires and the longitudinal wires are disposed parallelly.

3. The array substrate as claimed in claim 2, wherein a width of each of the second metal wires is greater than a width of each of the longitudinal wires.

4. The array substrate as claimed in claim 1, wherein an insulation layer is disposed between the first metal wires and the second metal wires.

5. The array substrate as claimed in claim 1, wherein the pixel electrodes are insulated from the first metal wires.

6. The array substrate as claimed in claim 1, wherein an insulation layer is disposed in intersecting portions between the pixel electrodes and the first metal wires and in intersecting portions between the pixel electrodes and the second metal wires.

7. A liquid crystal display device, comprising:
    the liquid crystal display panel as claimed in claim 6; and
    a backlight module disposed on a side of the array substrate away from the first metal wires, and providing the liquid crystal display panel with backlight.

8. The liquid crystal display device as claimed in claim 7, wherein the second metal wires and the longitudinal wires are disposed parallelly, a width of the second metal wires is greater than a width of the longitudinal wires, and a projection region of the black matrix on the substrate covers a projection region of the transverse wires and the thin film transistors on the substrate.

9. The liquid crystal display device as claimed in claim 7, wherein the array substrate is disposed on an upper layer of the backlight module, the liquid crystal layer is disposed on an upper layer of the array substrate, and the color filter substrate is disposed on an upper layer of the liquid crystal layer.

10. The array substrate as claimed in claim 1, wherein material of the first metal wires and the second metal wires is copper.

11. The array substrate as claimed in claim 1, wherein the pixel electrodes are transparent metal oxide electrodes.

12. The array substrate as claimed in claim 11, wherein the pixel electrodes are indium tin oxide electrodes.

13. A liquid crystal display panel, comprising:
    the array substrate as claimed in claim 1; and
    a color filter substrate disposed on a side of the array substrate disposed with the first metal wires, and disposed opposite to the array substrate;
    a liquid crystal layer disposed between the array substrate and the color filter substrate;
    wherein the color filter substrate comprises a color resist array including a plurality of color resist blocks and a black matrix disposed among the color resist blocks, a projection region of the black matrix on the substrate covers a projection region of the second metal wires on the substrate.

14. The liquid crystal display panel as claimed in claim 13, wherein in the array substrate, the second metal wires and the longitudinal wires are disposed parallelly.

15. The liquid crystal display panel as claimed in claim 14, wherein a width of the second metal wires is greater than a width of the longitudinal wires.

16. The liquid crystal display panel as claimed in claim 13, wherein an insulation layer is disposed between the first metal wires and the second metal wires.

17. The liquid crystal display panel as claimed in claim 13, wherein an insulation layer is disposed in intersecting portions between the pixel electrodes and the first metal wires and in intersecting portions between the pixel electrodes and the second metal wires.

18. The liquid crystal display panel as claimed in claim 13, wherein a projection region of the black matrix on the substrate covers a projection region of the transverse wires on the substrate.

19. The liquid crystal display panel as claimed in claim 13, wherein a projection region of the black matrix on the substrate covers a projection region of the thin film transistors on the substrate.

20. The liquid crystal display panel as claimed in claim 13, wherein the color resist blocks at least comprise red, green, and blue color resist blocks.

* * * * *